(12) United States Patent
Anyenya

(10) Patent No.: US 12,325,312 B2
(45) Date of Patent: Jun. 10, 2025

(54) MOBILE RANGE EXTENDER

(71) Applicant: Transportation IP Holdings, LLC, Norwalk, CT (US)

(72) Inventor: Gladys Anyenya, Fort Worth, TX (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 18/498,771

(22) Filed: Oct. 31, 2023

(65) Prior Publication Data
US 2024/0198817 A1 Jun. 20, 2024

Related U.S. Application Data

(60) Provisional application No. 63/387,699, filed on Dec. 16, 2022.

(51) Int. Cl.
*B60L 50/53* (2019.01)
*B60L 50/75* (2019.01)
*B61C 3/02* (2006.01)

(52) U.S. Cl.
CPC ............. *B60L 50/53* (2019.02); *B60L 50/75* (2019.02); *B61C 3/02* (2013.01); *B60L 2200/26* (2013.01)

(58) Field of Classification Search
CPC ...... B60L 50/53; B60L 50/75; B60L 2200/26; B61C 3/02
USPC ........................................................ 307/9.1
See application file for complete search history.

(56) References Cited

U.S. PATENT DOCUMENTS

| | | |
|---|---|---|
| 2010/0060093 A1 | 3/2010 | Hunter |
| 2010/0186619 A1 | 7/2010 | Kumar |
| 2018/0126858 A1 | 5/2018 | Blum et al. |
| 2021/0155108 A1 | 5/2021 | Martin et al. |

FOREIGN PATENT DOCUMENTS

| | | | |
|---|---|---|---|
| DE | 102015008829 A1 | 1/2016 | |
| EP | 1245431 A2 * | 10/2002 | ............. B60L 11/12 |
| EP | 3451486 A1 | 3/2019 | |

OTHER PUBLICATIONS

European Search Report dated Apr. 24, 2024 for corresponding European Patent Application No. 23215762.8.

* cited by examiner

*Primary Examiner* — Hal Kaplan
(74) *Attorney, Agent, or Firm* — K&L Gates LLC

(57) ABSTRACT

A mobile energy supply system may include a fuel source, an energy converter, and a transfer device. The fuel source may be disposed onboard a vehicle chassis and may hold a supply of a fuel. The energy converter may be disposed onboard the vehicle chassis and may convert at least a portion of the supply of the fuel from the fuel source into electric energy. The transfer device may be disposed onboard the vehicle chassis and be electrically couplable to a propulsion vehicle. The transfer device may transfer the electric energy from the energy converter offboard of the vehicle chassis and to the propulsion vehicle for powering a propulsion system of the propulsion vehicle.

22 Claims, 3 Drawing Sheets

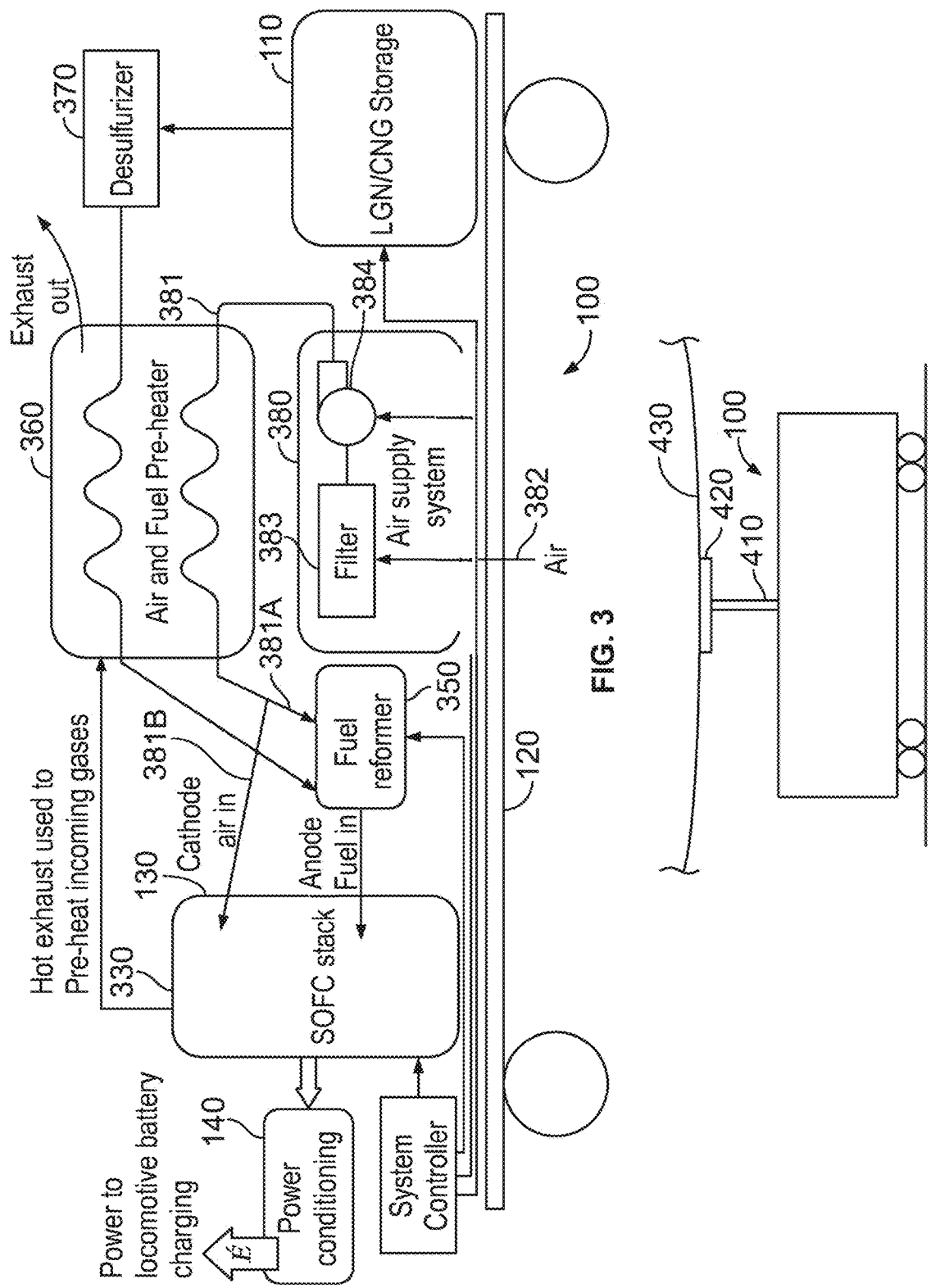

MOBILE RANGE EXTENDER

CROSS-REFERENCE TO RELATED APPLICATIONS

This application claims priority to U.S. Provisional Application No. 63/387,699 (filed 16 Dec. 2022), the entire disclosure of which is incorporated herein by reference.

BACKGROUND

Technical Field

The subject matter described herein relates to mobile range extenders used for providing energy to vehicles, for example electrically powered vehicles.

Discussion of Art

Electric power may be used to propel vehicles. The electric power for propelling a vehicle may be stored onboard the vehicle using one or more batteries. However, batteries may have limited power densities that provide a lower available travel range compared to fueled vehicle systems. Further, infrastructure for delivering remotely-generated electric energy to vehicles may be limited. It may be desirable to have a system and method that differs from those that are currently available.

BRIEF DESCRIPTION

In one embodiment, a mobile energy supply system includes a fuel source, an energy converter, and a transfer device. The fuel source may be disposed onboard a vehicle chassis and may hold a supply of a fuel. The energy converter may be disposed onboard the vehicle chassis and may convert at least a portion of the supply of the fuel from the fuel source into electric energy. The transfer device may be disposed onboard the vehicle chassis and be electrically couplable to a propulsion vehicle. The transfer device may transfer the electric energy from the energy converter off-board of the vehicle chassis and to the propulsion vehicle for powering a propulsion system of the propulsion vehicle.

In another embodiment, a method can include converting at least a portion of a supply of fuel held in a fuel source onboard a vehicle chassis into electric energy using an energy converter also onboard the vehicle chassis. The method also can include transferring the electric energy from the vehicle chassis to a propulsion vehicle. Also, the method can include powering a propulsion system of the propulsion vehicle using the electric energy.

In another embodiment, a mobile energy supply system includes a vehicle chassis, a fuel source disposed onboard the vehicle chassis, an energy converter disposed onboard the vehicle chassis, and a transfer device disposed onboard the vehicle chassis. The fuel source may hold a supply of a fuel. The energy converter may convert at least a portion of the supply of the fuel from the fuel source into electric energy. The transfer device may transfer the electric energy from the energy converter to an energy storage device of a propulsion vehicle for powering a propulsion system of the propulsion vehicle.

BRIEF DESCRIPTION OF THE DRAWINGS

The subject matter may be understood from reading the following description of non-limiting embodiments, with reference to the attached drawings, wherein below:

FIG. 3 is a side elevational schematic view of another example of a mobile energy supply system;

FIG. 4 is a side elevational schematic view of another example of a mobile energy supply system.

DETAILED DESCRIPTION

Embodiments of the subject matter described herein relate to systems and methods for use as range extenders or mobile energy supply systems. The mobile energy supply systems and methods described herein may provide energy to propulsion vehicles to extend the range of the propulsion vehicles. One or more energy supply systems described herein use an energy converter to convert a first energy supply (e.g., a fuel that the propulsion vehicle can use) into a form of energy (e.g., electric energy) that the propulsion vehicle can use. In one example, the propulsion vehicle may not be capable of directly receiving energy from the power source due to an incompatibility between the propulsion vehicle and the power source. The mobile energy supply systems can obtain the energy from the power source, and then transfer that energy to the propulsion vehicle in a form that the propulsion vehicle can use.

While one or more embodiments are described in connection with a rail vehicle system, not all embodiments are limited to rail vehicle systems. The subject matter described herein extends to various types of vehicle systems. Suitable vehicle systems may include one or more automobiles, trucks (with or without trailers), buses, marine vessels, aircraft, mining vehicles, agricultural vehicles, industrial vehicles, or off-highway vehicles. The vehicle systems described herein may be either a single vehicle or may include multiple vehicles that move cooperatively with each other. With respect to multi-vehicle systems, the vehicles may be mechanically coupled with each other (e.g., by couplers), or may be logically, communicatively or virtually coupled but not mechanically coupled. For example, vehicles may be logically but not mechanically coupled when the separate vehicles communicate with each other to coordinate movements of the vehicles with each other so that the vehicles travel together (e.g., as a convoy, consist, swarm, fleet or platoon).

With regard to the fuel, the fuel may be a single fuel type in one embodiment and in other embodiments the fuel may be a mixture of different fuels. In one example of a fuel mixture, a first fuel may be liquid and a second fuel may be gaseous. A suitable liquid fuel may be diesel (regular, biodiesel, HDRD, and the like), gasoline, kerosene/jet fuel, dimethyl ether (DME), alcohol, and the like. A suitable gaseous fuel may be natural gas (methane), propane, or other short chain hydrocarbon, hydrogen, ammonia, and the like. In one embodiment, fuel may be inclusive of stored energy as used herein. In that perspective, a battery state of charge, or a source of compressed gas, a flywheel, fuel cell, and other types of non-traditional fuel sources may be included.

Figure 1:
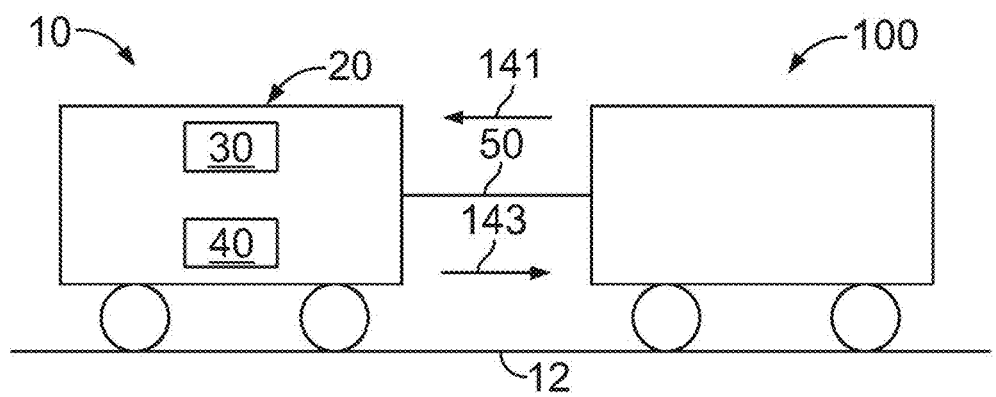
FIG. 1 is a block diagram of one example of a vehicle system.

FIG. 1 provides a block diagram of a vehicle system 10 that includes a propulsion vehicle 20 and a mobile energy supply system 100. The propulsion vehicle and mobile energy supply system are coupled by a power transfer link 50 in the illustrated example. The propulsion vehicle and mobile energy supply system travel along a route 12, such as a rail, track, road, etc. The link may represent multiple connections in various embodiments, and may represent one or more structural connections (e.g., a cable) and/or one or more non-structural connections (e.g., wireless communication link) used for the transfer or conduction of electric energy and/or communication. The propulsion vehicle and mobile energy supply system in some examples may be mechanically connected by a coupler.

The mobile energy supply system of FIG. 1 provides electric energy to the propulsion vehicle via the link. In some embodiments, the propulsion vehicle may provide electric energy to the mobile energy supply system. For instance, in the depicted example, the mobile energy supply system provides a first electric energy 141 to the propulsion vehicle. This first electric energy can be used for various purposes, such as charging one or more batteries or other storage devices of the propulsion vehicle. Also, the mobile energy supply system can receive a second electric energy 143 from the propulsion vehicle. This second electric energy can be used for powering one or more loads of the mobile energy supply system. The first and second electric energies may be provided at different times. For example, the first electric energy may be provided at a first time, and the second electric energy may be provided at a previous and/or subsequent time. In some examples, the first electric energy is a larger fraction of the total energy transferred than the second electric energy.

The propulsion vehicle and the mobile energy supply system may communicate with each other via the link. For example, the propulsion vehicle may inform the mobile energy supply system of a form and/or amount of energy desired by the propulsion vehicle, and/or the mobile energy supply system may inform the propulsion vehicle of a form and/or amount of energy that the mobile energy supply system has available. Further still, in various embodiments, a remote source may provide instructions and/or requests to the propulsion vehicle and/or mobile energy supply system. Additionally or alternatively, the propulsion vehicle and mobile energy supply system may communicate in another way without using the link.

The propulsion vehicle includes a propulsion system 40 that can propel the propulsion vehicle along a route during a mission. For example, the propulsion vehicle may be a rail vehicle (locomotive) and the propulsion system may utilize electric energy to propel the propulsion vehicle along the rail. In the illustrated example, the propulsion vehicle includes a propulsion vehicle energy storage system 30. For example, the propulsion vehicle energy storage system may include a bank of batteries. In various examples, the propulsion vehicle energy storage system may include one or more of a battery bank, capacitor bank, fuel cell, or a flywheel. In various examples, the mobile energy system delivers electric energy to the energy storage system of the propulsion vehicle. It may be noted that the energy transfer may be hardwired and/or transferred in a non-contact inductive manner. Various examples of components that may be used during energy transfer include catenaries, electrified rails, and/or charging stations.

The mobile energy supply system may be used to provide electric energy to the propulsion vehicle in an area in which electric energy is generally not otherwise available to the propulsion vehicle, for example due lack of sufficient infrastructure to provide electric energy. The mobile energy supply system may be used to provide electric energy to the propulsion vehicle when the battery range of the propulsion vehicle is not sufficient for travel between otherwise available charging locations. In some embodiments, the mobile energy supply system may travel with the propulsion vehicle (e.g., as part of a consist transported by one or more propulsion vehicles). When traveling with the propulsion vehicle, the mobile energy supply system may be immediately adjacent to the propulsion vehicle in some examples, while in other examples there are one or more intermediate vehicles between the propulsion vehicle and the mobile energy supply system. While traveling with the propulsion vehicle, the mobile energy supply system may act as a trickle charger for the propulsion vehicle, thereby helping to reduce the effects of transients. Alternatively or additionally, the mobile energy supply system may link with the propulsion system at a remote location, or at a determined location, such as a railyard or vehicle lot. The mobile energy supply system and propulsion system may link together while moving, such as during the performance of a mission, and/or may link together while stationary, for example at a siding.

Figure 2:
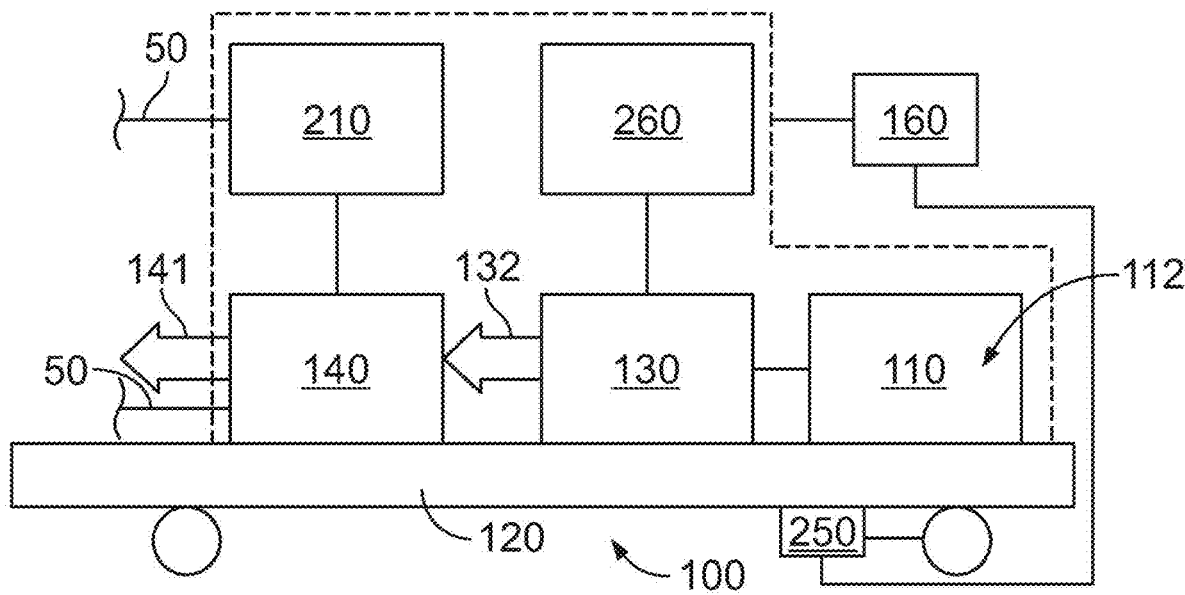
FIG. 2 is a side elevational schematic view of one example of a mobile energy supply system.

As discussed herein, example mobile energy supply systems provide an energy that can be used by the propulsion vehicle, where the energy is obtained from an energy source that is unable to be used by the propulsion vehicle. FIG. 2 provides a side elevational schematic view of an example of the mobile energy supply system of FIG. 1. The example mobile energy supply system depicted in FIG. 2 includes a fuel source 110, an energy converter 130, and a transfer device 140. The fuel source, energy converter, and transfer device can be mounted to a vehicle chassis 120 of the mobile energy supply system. The mobile energy supply system may be cab-less, or put another way, there may be no cab or operator room disposed on the vehicle chassis. Alternatively, the mobile energy supply system may be driverless in that the mobile energy supply system can operate (e.g., self-propel) without any operator being onboard the mobile energy supply system, regardless of whether a cab is included in the mobile energy supply system. In some examples, the mobile energy system may be operated via a remote control. With the various components of the mobile energy supply system mounted to the vehicle chassis, the mobile energy system may be moved or transported to provide energy at a desired location. For example, the vehicle chassis may have wheels mounted thereto that can be used with a rail system, and the vehicle chassis may be moved along the rail system to provide energy to a powered rail propulsion vehicle (e.g., locomotive) at a location convenient for the powered rail propulsion vehicle.

The depicted fuel source may be disposed onboard the vehicle chassis of the mobile energy supply system and may hold a supply of fuel 112. The depicted fuel source, for example, may include one or more re-fillable tanks mounted to the vehicle chassis, along with appropriate peripheral devices such as hoses, nozzles, meters, pumps, and the like. Various different fuels may be stored in the fuel source in containers suitable for the purpose.

The illustrated energy converter is disposed onboard the vehicle chassis and may convert at least a portion of the supply of fuel from the fuel source into electric energy 132 to be supplied directly or indirectly to the propulsion vehicle. In the example illustrated in FIG. 2, an indirect supply is depicted. More specifically, the electric energy from the energy converter is provided to the transfer device which in turn provides the first electric energy to the propulsion vehicle. The energy converter in various examples can convert fuel to electric energy. Suitable energy converters may include an engine (such as an internal combustion engine), a flow battery, and a fuel cell. Suitable fuels may include one or more of liquefied natural gas (LNG), compressed natural gas (CNG), diesel, gasoline, kerosene, dimethyl ether, alcohol, hydrogen, methanol, and/or ammonia, for example. Suitable fuel cells may include a solid oxide fuel cell (SOFC), a proton exchange membrane (PEM) fuel cell, an alkaline fuel cell, direct methanol fuel cell, molten carbonate fuel cell, and an acid fuel cell. Suitable acid fuel cells may include solid acid and phosphoric acid fuel cells. Examples of suitable fuel cell electrodes may include a catalyst containing platinum and ruthenium; or a catalyst containing titanium tungsten oxide nanoparticles that are coated with a layer of platinum. A suitable polymer membrane may be Nafion, which is commercially available from Du Pont, or expanded porous polytetrafluoroethylene (ePTFE).

Additional details and components that may be used in conjunction with a mobile energy supply system utilizing a fuel cell may be seen in FIG. 3. Some additional components may be selected with reference to the fuel type and the fuel cell type. These components may include reformers, hydrators, dehumidifiers, filters, scrubbers, purifiers, and molecular sieves, and the like. In one embodiment, the component may be a desulfurizer. Selective sorbents may be used. A Water Gas Shift Reactor (WGSR) and/or device for the Preferential Oxidation of CO (PROX) may be used. Among other functions, these components may act to reduce or remove catalyst and membrane poisons from fluid streams.

Suitable molecular sieves can be formed using microporous, mesoporous, or macroporous material. Microporous material (<2 nm) may include zeolites (aluminosilicate minerals, e.g.), porous glass, activated carbon, clay, and montmorillonite intermixes, such as Halloysite (endellite). Mesoporous material (2-50 nm) may include silicon dioxide. And, macroporous material (>50 nm) may include mesoporous silica or alumina. These sieves, as well as scrubbers and purifiers, may remove contaminants from the fuel cell feed flows. Contaminants may poison the electrode, catalyst or membrane. Exemplary poisons may include sulfur, carbon monoxide, nitric oxides (NOx), and the like. Other poisons may include one or more organic functional groups and inorganic anions. Still other poisons may be identified as having an ability to strongly adsorb to metal surfaces. Particular poisons may depend on the type of electrode and/or fuel cell, but may include one or more halides, cyanides, sulfides, sulfites, phosphates, phosphites and organic molecules such as nitriles, nitro compounds, oximes, and nitrogen-containing heterocycles. In one embodiment, activated carbon combined with an additively manufactured intake filter may be used to remove contaminants and poisons. Venting and purging may be done to fluid transfer lines to reduce or eliminate contaminants.

Not shown is an arrangement of fuel cells that are electrically coupled, but which receive the fuel and/or oxidant supply in a cascade arrangement. The electrical output and health of the fuel cell may be monitored. In the event that the fuel cells receive a contaminant in the feed of fuel or oxidant, the performance of the poisoned fuel cell may degrade or decrease. The monitoring system may respond in a variety of ways to detection of a poisoned fuel cell. However, the cascade system of fuel/oxidant may allow for the downstream fuel cells from being contaminated as the first-in-flow of the cascading fuel/oxidant may experience degradation first (being the first to receive the contaminant) and therefore the fuel cell to absorb the contaminate. The controller may react to detection of decreased performance in the first-in-flow fuel cell to protect the subsequent fuel cells from contamination.

FIG. 3 provides a side schematic view of an example mobile energy supply system that utilizes a SOFC as an energy converter. All the depicted components in the illustrated example are disposed onboard the vehicle chassis (e.g., mounted directly or indirectly to the vehicle chassis). The mobile energy supply system depicted in FIG. 3 includes a fuel cell 330 (which represents an example of the energy converter of FIG. 2). The fuel cell shown is an SOFC stack. The fuel cell may convert the fuel from the fuel source (e.g., natural gas in the illustrated example) into electric energy. In the depicted example using natural gas, a fuel reformer 350 of the mobile energy supply system is utilized so that the SOFC does not directly accept natural gas.

As seen in FIG. 3, for the depicted example, natural gas from the fuel source is sent to a desulfurizer 370. From the desulfurizer, the fuel then passes through an air and fuel pre-heater 360, and from the air and fuel pre-heater to the fuel reformer. Reformed fuel from the reformer is provided to the anode of the fuel cell to facilitate energy conversion and production of electric energy by the fuel cell. Suitable reformers may include an injector, steam generator, sulfur trap, igniter, fuel & water pump, air blower, fuel/air/water supply, and a controller. Suitable reforming methods may include Catalytic Partial Oxidation (CPOX), Catalytic Autothermal Reforming (ATR), and Catalytic Steam Reforming (CSR). In one embodiment, in operation of the reformer the controller accounts for a natural gas fuel source having a changing methane to non-methane hydrocarbon ratio as the LNG tank is consumed (with lighter hydrocarbons converting to gas before ethane, propane, etc. fractions gasify).

A supply of air 381 may be provided to the fuel reformer, as well as the fuel cell. The depicted mobile supply system includes an air supply system 380 that includes a filter 383 and a compressor/blower 384. Atmospheric air 382 to the air and fuel pre-heater is drawn through the filter and distributed by the compressor/blower. Heated air 381A from the air and fuel pre-heater is then provided to fuel reformer. Also, heated air 381B from the air and fuel pre-heater may be provided to the cathode of the fuel cell. The pre-heat may facilitate or improve energy conversion and production of electric energy by the fuel cell. Electric energy from the fuel cell may be then provided to the transfer device (which, as also discussed herein, may include or have associated therewith a power conditioner), and from the transfer device to a propulsion vehicle (e.g., the locomotive of FIG. 1).

With continued reference to FIG. 2, the transfer device can be disposed onboard the vehicle chassis, and to transfer the electric energy from the energy converter to a propulsion vehicle (e.g., the propulsion vehicle depicted in FIG. 1), for powering a propulsion system of the propulsion vehicle. The transfer device in various examples includes power conditioning circuitry to modify the electric energy from the energy converter to a form more readily usable or compatible with the propulsion system of the propulsion vehicle, for example by altering a voltage of the energy provided to the propulsion vehicle to satisfy characteristics of one or more batteries being charged and/or to avoid spikes in voltage. The transfer device in various examples may include associated equipment for power delivery to the propulsion vehicle, including plugs, contacts, switches, cables, meters, or the like. The transfer device in the depicted example can transfer the electric energy to the propulsion vehicle while the propulsion vehicle is coupled with the vehicle chassis (e.g., via the transfer link). In some examples, the transfer device transfers the electric energy to an energy storage device of the propulsion vehicle (e.g., propulsion vehicle energy storage system 30 of FIG. 1).

The transfer device in various examples can use different techniques to transfer the electric energy. For example, one or more of a rail, a catenary, a cable, or wireless transfer system may be employed. The transmission method may be selected with reference to end use requirements. In one embodiment, the link of the transfer device comprises two complimentary halves of the system. As the vehicle chassis approaches the propulsion vehicle there may be a communication handshake. The handshake may determine if successful coupling is possible, the status of the components, the fuel level in the fuel storage, and the like. Upon contact the two halves of the link may couple and at least establish an electrical connection. In some embodiments, there is both an electrical and a mechanical connection formed. The controller may note a successful coupling (electrical, mechanical, communicative, or a combination thereof). The controller may initiate a diagnostic check. If the controller is on the propulsion system, the diagnostic may be of the vehicle chassis and the components thereon. If the controller is on the vehicle chassis, the diagnostic may be of propulsion vehicle and the components thereon. If both the vehicle chassis and the propulsion vehicle have controllers, the controllers may exchange data on their respective equipment. Further, the vehicle chassis controller may slave itself to the propulsion vehicle controller to follow controls issued therefrom.

During operation, the propulsion system may determine future need for power generation and may communicate that to the vehicle chassis controller. The vehicle chassis controller may then prepare to meet the future power need. Further, the propulsion vehicle may communicate upcoming operational conditions to the controller on the vehicle chassis. The vehicle chassis controller may prepare to operate under the supplied conditions. For example, in the event that the propulsion vehicle controller becomes aware of an upcoming heavy duty cycle, the vehicle chassis controller may initiate a build up of power generation capability prior to the actual demand for power. In another example, if the propulsion vehicle controller becomes aware of an upcoming tunneling (or similar) event, the vehicle chassis controller may switch operating modes to account for, e.g., higher ambient temperatures, lower ambient oxygen content, loss of offboard communication capabilities, and the like. Suitable responses may include a pre-cooling strategy for components where heat dissipation is important, increasing an air flow rate to offset lowered oxygen content, and topping off battery charge. Another response may be to switch to battery-only mode while hibernating the fuel cell during the tunneling event. In one example using a reversible fuel cell, if the propulsion vehicle controller signals that regenerative braking may be used, and therefore to generate power that can flow from the propulsion vehicle to the vehicle chassis, the vehicle chassis controller may switch operating modes to receive electricity rather than produce it.

An example of an overhead charging of a mobile energy supply system in accordance with various examples is shown in FIG. 4. As seen in FIG. 4, the example mobile energy supply system includes a boom 410 that articulates an overhead transfer device 420 into and out of contact with an overhead charging cable 430. The overhead charging cable is in electrical communication with a propulsion vehicle (e.g., the locomotive of FIG. 1, not shown in FIG. 4). The boom is depicted as a telescoping device for ease of illustration. Other configurations and arrangements may be used in other examples. For instance, a suitable boom may be a pantograph, and/or the charging cable may include plural cables. The overhead transfer device may be movable between an engaged position shown in FIG. 4 and a disengaged position in which the overhead transfer device is spaced a distance from the overhead charging cable. When the overhead transfer device is in the engaged position, the mobile energy supply system is in electrical communication with the overhead charging cable and may deliver electric energy to the propulsion vehicle via the overhead charging cable. When the overhead transfer device is in the withdrawn position, the mobile energy supply system is not in electrical communication with the propulsion vehicle.

With continued reference to FIG. 2, the example mobile energy supply system depicted in FIG. 2 may include an energy storage device 210 that can be disposed onboard the vehicle chassis. The depicted energy storage device can store at least some of the electric energy generated by the energy converter, and can transfer the energy it stores to the propulsion vehicle (e.g., via the link). By storing energy onboard for subsequent transfer to the propulsion vehicle, for example, the mobile energy supply system may be operated to pre-generate an amount of energy before being coupled to the propulsion vehicle, thereby having an already converted and readily available for transfer amount of energy available to the propulsion vehicle at a convenient time for the propulsion vehicle, helping to improve the time efficiency of energy transfer to the propulsion vehicle.

The depicted energy storage device of the mobile energy supply system may also transfer at least some of the electric energy it stores to one or more components of the mobile energy supply system itself. For example, energy from the energy storage device may be provided to a propulsion motor 250 mounted to the vehicle chassis. The propulsion motor can propel the vehicle chassis using at least some of the energy from the energy converter. It may be noted that in various examples the energy may be provided directly from the energy converter and/or indirectly from the energy converter (e.g., via the energy storage device of the mobile energy supply system). One or more types of energy storage devices may be employed in various examples. Example energy storage devices include one or more battery cells, capacitor storage banks, or flywheels.

The depicted mobile energy supply system of FIG. 2 may include a controller 160 (which in various examples represents one or more aspects of the vehicle chassis controller discussed herein). The controller is depicted by a single block in FIG. 2, but in other embodiments may include multiple distributed controllers that work in tandem, or are in communication, with each other. In various embodiments, the mobile energy supply system may include a communications system 260 that can communicate with the propulsion vehicle. The communications system may include one or more cables and/or antennae and may utilize hardwired and/or wireless communications in various examples. The controller can command various components of the mobile energy supply system to perform appropriate tasks for the conversion and transfer of energy, or to specify tasks to be undertaken by one or more aspects of the mobile energy supply system. For example, the controller may instruct various components to perform actions to coordinate the amount and timing of fuel and air delivery to the energy converter. As another example, the controller may instruct the propulsion motor to operate to move the mobile energy supply system to a desired location for providing energy to the propulsion unit.

Additionally or alternatively, the communications system may be utilized in connection with operating one or more components of the mobile energy supply system. For example, the communication system may can communicate one or more operational signals between the energy converter and the propulsion vehicle. By way of example, the operational signals may include one or more of a capacity of the energy storage device, a state of charge of the energy storage device, a temperature of the energy storage device, an amount of the fuel in the fuel source, or a temperature of the energy convertor. Accordingly, the propulsion vehicle and mobile energy supply system may share information regarding aspects of one or both to facilitate appropriate energy transfer or other actions.

Additionally, the controller in various examples may determine the timing of energy delivery. For example, in some examples, the energy storage device can transfer (e.g., under direction of the controller and/or operational signals from the propulsion vehicle) at least some of the electric energy it has stored to the propulsion vehicle responsive to a change in an energy demand of the propulsion vehicle. For example, based on information received from a sensor of the transfer device and/or information from the propulsion vehicle received via the communication system regarding energy demand of the propulsion vehicle, the controller may direct the energy storage device to initiate delivery of electric energy to the propulsion vehicle. For example, an energy demand of a propulsion vehicle may exceed a predetermined threshold due to speeding up, going up an incline, or the like, in response to which additional energy is provided to propulsion vehicle. Alternatively or additionally, delivery may be terminated, increased, and/or decreased relative to change in energy demand or other state of the propulsion vehicle.

Additionally or alternatively to the timing of energy delivery, the timing of energy conversion may be controlled in various examples. For example, the energy converter in various examples can (e.g., under direction of the controller and/or operational signals from the propulsion vehicle controller) convert at least a portion of the supply of the fuel from the fuel source into electric energy responsive to receiving an indication (e.g., from the controller) of an increase in demand from the electric energy (e.g., an upcoming incline in a grade of a route on which the propulsion vehicle is moving). As another example, the energy converter may convert at least a portion of the supply of the fuel from the fuel source in the electric energy responsive to a state of charge of an energy storage device onboard the propulsion vehicle falling below a determined threshold. Accordingly, a supply of energy may then be readily available as needed by the propulsion vehicle. Various responsive actions may be provided for in different examples. For instance, an energy converter startup sequence may be initiated responsive to an indication of increased demand, or, as another example, responsive to an indication of upcoming coupling of the mobile energy supply system and the propulsion vehicle. As another example, delivery of electric energy to the propulsion vehicle may be initiated responsive to an indication of increased demand, or, as another example, responsive to an indication of successful coupling between the mobile energy supply system and the propulsion vehicle.

In one embodiment, the vehicle chassis controller can respond to being in an uncoupled state by switching from an operating mode to another mode, such as a safe mode or a hibernate mode. The safe mode may be used in response to a sudden or unexpected decoupling with the propulsion vehicle. In the safe mode, the system may shut down energy production/fuel conversion, may close off valves, and may monitor for leaks, fire, electrical shorts, and the like. The hibernate mode may be a safe shut down, and may include topping off battery charge prior to tapering energy production. In a fueling mode, the controller may cool components that are normally hot during operation (e.g., in an SOFC) such as by reducing energy production. Once cool, the replenishment of the fuel storage may be done. In another embodiment, the vehicle chassis controller may note a reduction in performance (electricity generation) or increase in electrical resistance in a fuel cell that is one of a bank of fuel cells and may respond by operating that fuel cell differently than the other fuel cells in the fuel cell bank. And, during the normal operating mode if the requested power generation rate is less than the total capability of the fuel converter, the controller may individually cycle through fuel cells in the bank of fuel cells so that only as many fuel cells are needed to provide the requested amount of power while the fuel cells are operated at highly efficient operating point. As the requested power load changes, increases or decreases, the controller can bring online or retire other fuel cells so that the fuel cells meeting the demand are running at their optimum level, and other fuel cells are held in reserve.

Figure 5:
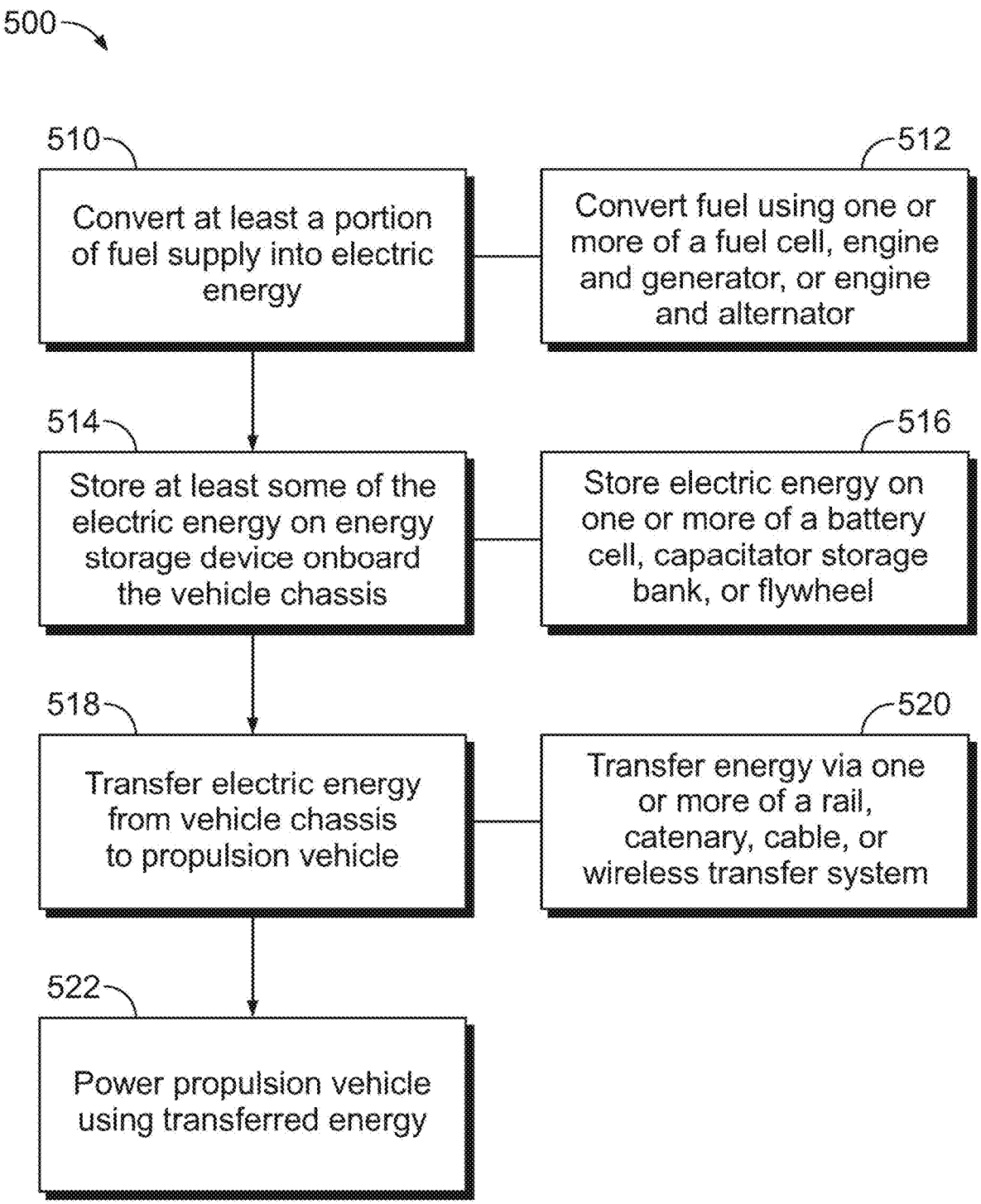
FIG. 5 is a block diagram of an example method for providing energy to a vehicle.

FIG. 5 provides a flowchart of a method 500 (e.g., for providing energy to a propulsion vehicle using a mobile energy supply system), in accordance with various embodiments. The method depicted in FIG. 5, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method may be able to be used as one or more algorithms to direct hardware (e.g., one or more aspects of the controller) to perform one or more operations described herein.

At step 510, at least a portion of a supply of fuel is converted into electric energy. The supply of fuel is held in a fuel source onboard a vehicle chassis of a mobile energy supply system (e.g., mobile energy supply system 100). The supply of fuel is converted into electric energy using an energy converter that is also onboard the vehicle chassis. Accordingly, the energy conversion takes place onboard the vehicle chassis of the mobile energy supply system.

Various different techniques may be selected for use in different examples to convert the fuel into electric energy. For instance, in the illustrated example, at step 512, at least a portion of the supply of fuel is converted into electric energy using one or more of a fuel cell, a first combination that includes an engine and a generator, or a second combination that includes the engine and an alternator.

At step 514, at least some of the electric energy may be stored on an energy storage device onboard the vehicle chassis of the mobile energy supply system. For instance, at step 516, at least some of the electric energy is stored on one or more of a battery cell, capacitor storage bank, or flywheel mounted onboard the vehicle chassis of the mobile energy supply system.

At step 518 the electric energy is transferred from the vehicle chassis (e.g., from one or more components mounted onboard the vehicle chassis) to a propulsion vehicle. In some examples, the mobile energy supply system may travel to the propulsion vehicle in order to provide energy, and depart from the propulsion vehicle after the energy is delivered. In other examples, the mobile energy supply system may travel with the propulsion vehicle (e.g., as part of a consist including the propulsion vehicle). In some examples, the mobile energy supply system acts as a trickle charger for the propulsion vehicle when traveling with the propulsion vehicle. The electric energy in the depicted example may be transferred from the energy storage device onboard the vehicle chassis, while in other examples step 514 may be omitted and energy may be delivered from an energy converter to the propulsion vehicle (e.g., to an energy storage device of the propulsion vehicle) without intermediate storage. In one embodiment, energy may be delivered from both an energy storage device and an energy converter (e.g., via a power conditioner).

Different techniques may be used in various examples for energy delivery from the mobile energy supply system to the propulsion vehicle. For instance, in the illustrated example, at step 520, the electric energy may be sent from the vehicle chassis of the mobile energy supply system to the propulsion vehicle. This may be done via one or more of a rail, a catenary, a cable, or a wireless transfer system depending on the end use requirements.

At step 522, with a sufficient amount of energy transferred to the propulsion vehicle, the propulsion vehicle is powered using the electric energy. For example, the power may be used to power the propulsion vehicle along a route to perform a mission.

In one example, a mobile energy supply system includes a fuel source, an energy converter, and a transfer device. The fuel source may be disposed onboard a vehicle chassis and may hold a supply of a fuel. The energy converter may be disposed onboard the vehicle chassis and may convert at least a portion of the supply of the fuel from the fuel source into electric energy. The transfer device may be disposed onboard the vehicle chassis and be electrically couplable to a propulsion vehicle. The transfer device may transfer the electric energy from the energy converter offboard of the vehicle chassis and to the propulsion vehicle for powering a propulsion system of the propulsion vehicle.

The mobile energy supply system may also include an energy storage device that may be disposed onboard the vehicle chassis, and may store at least some of the electric energy that is generated by the energy converter. The energy storage device may transfer the at least some of the electric energy stored in the energy storage device to the propulsion vehicle.

The energy storage device may transfer the at least some of the electric energy stored in the energy storage device to the propulsion vehicle responsive to a change in an energy demand of the propulsion vehicle. The energy storage device may include one or more of a battery bank, a capacitor bank, and a flywheel.

The mobile energy supply system may further include a propulsion motor configured to propel the vehicle chassis using at least some of the electric energy from the energy converter.

The transfer device may transfer the electric energy to the propulsion vehicle while the propulsion vehicle is coupled with the vehicle chassis.

The fuel source may hold and the energy converter may convert one or more of natural gas, diesel, gasoline, kerosene, dimethyl ether, alcohol, or ammonia. In other examples, the fuel source may hold and the energy converter may convert hydrogen.

The energy converter may include an engine and at least one generator or alternator.

The transfer device may transfer the electric energy to the propulsion vehicle via one or more of a rail, a catenary, a cable, or a wireless transfer system.

The electric energy may be a first electric energy, and the transfer device may receive a second electric energy from the propulsion vehicle.

A controller may direct the energy converter to convert at least a portion of the supply of the fuel from the fuel source into the electric energy responsive to receiving an indication of an increase in demand for the electric energy (e.g., an upcoming incline in a grade of a route on which the propulsion vehicle is moving). The controller may direct the energy converter to convert at least a portion of the supply of the fuel from the fuel source into the electric energy responsive to a state of charge of an energy storage device onboard the propulsion vehicle falling below a predetermined threshold.

The mobile energy supply system may further comprise a communication device that may communicate one or more operational signals between the energy converter and the propulsion vehicle. The one or more operational signals may include one or more of a capacity of an energy storage device, a state of charge of the energy storage device, a temperature of the energy storage device, an amount of the fuel in the fuel source, or a temperature of the energy converter.

In another example, a method includes a step of converting at least a portion of a supply of fuel held in a fuel source onboard a vehicle chassis into electric energy using an energy converter also onboard the vehicle chassis. The method also includes a step of transferring the electric energy from the vehicle chassis to a propulsion vehicle. Also, the method includes a step of powering a propulsion system of the propulsion vehicle using the electric energy. The electric energy may be sent from the vehicle chassis to the propulsion vehicle via one or more of a rail, a catenary, a cable, or a wireless transfer system.

The method may also include the steps of storing at least some of the electric energy on an energy storage device onboard the vehicle chassis; and transferring the at least some of the electric energy stored in the energy storage device to the propulsion vehicle. At least some of the electric energy may be stored in an energy storage device onboard the vehicle chassis, and the energy storage device may include one or more of a battery cell, a capacitor storage bank, or a flywheel.

The method may also include the step of converting at least a portion of the supply of fuel into electric energy using one or more of a fuel cell, a first combination of an engine and a generator, or a second combination of the engine and an alternator.

In another example, a mobile energy supply system includes a vehicle chassis, a fuel source disposed onboard the vehicle chassis, an energy converter disposed onboard the vehicle chassis, and a transfer device disposed onboard the vehicle chassis. The fuel source may hold a supply of a fuel. The energy converter may convert at least a portion of the supply of the fuel from the fuel source into electric energy. The transfer device may transfer the electric energy from the energy converter to an energy storage device of a propulsion vehicle for powering a propulsion system of the propulsion vehicle.

The energy storage device of the propulsion vehicle may include one or more of a battery cell, a capacitor storage bank, or a flywheel.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

The controller may include one or more processors and/or computer memories. The controller, for example, may include one or more of a microprocessor, field programmable gate array, integrated circuit, and/or hard drive.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., a location or change in location), use a model that associates locations with different operating modes to select an operating mode of the one or more functional devices of the HOV unit and/or EOV unit, and then provide an output (e.g., the operating mode selected using the model). The controller may receive additional input of the change in operating mode that was selected, such as analysis of noise or interference in communication signals (or a lack thereof), operator input, or the like, that indicates whether the machine-selected operating mode provided a desirable outcome or not. Based on this additional input, the controller can change the model, such as by changing which operating mode would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A. (2) at least one B. (3) at least one C. (4) at least one A and at least one B. (5) at least one A, at least one B, and at least one C. (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A mobile energy supply system, comprising:
a fuel source configured to be disposed onboard a vehicle chassis and hold a supply of a fuel;
an energy converter configured to be disposed onboard the vehicle chassis and to convert at least a portion of the supply of the fuel from the fuel source into electric energy; and
a transfer device configured to be disposed onboard the vehicle chassis and electrically couplable to a propulsion vehicle, and configured to transfer the electric energy from the energy converter offboard of the vehicle chassis and to the propulsion vehicle for powering a propulsion system of the propulsion vehicle.

2. The mobile energy supply system of claim 1, further comprising an energy storage device configured to be disposed onboard the vehicle chassis and to store at least some of the electric energy that is generated by the energy converter, the energy storage device configured to transfer the at least some of the electric energy stored in the energy storage device to the propulsion vehicle.

3. The mobile energy supply system of claim 2, wherein the energy storage device is configured to transfer the at least some of the electric energy stored in the energy storage device to the propulsion vehicle responsive to a change in an energy demand of the propulsion vehicle.

4. The mobile energy supply system of claim 2, wherein the energy storage device includes one or more of a battery bank, a capacitor bank, and a flywheel.

5. The mobile energy supply system of claim 1, further comprising a propulsion motor configured to propel the vehicle chassis using at least some of the electric energy from the energy converter.

6. The mobile energy supply system of claim 1, wherein the transfer device is configured to transfer the electric energy to the propulsion vehicle while the propulsion vehicle is coupled with the vehicle chassis.

7. The mobile energy supply system of claim 1, wherein the fuel source is configured to hold and the energy converter is configured to convert one or more of natural gas, diesel, gasoline, kerosene, dimethyl ether, alcohol, or ammonia.

8. The mobile energy supply system of claim 1, wherein the fuel source is configured to hold and the energy converter is configured to convert hydrogen.

9. The mobile energy supply system of claim 1, wherein the energy converter comprises an engine and at least one generator or alternator.

10. The mobile energy supply system of claim 1, wherein the transfer device is configured to transfer the electric energy to the propulsion vehicle via one or more of a rail, a catenary, a cable, or a wireless transfer system.

11. The mobile energy supply system of claim 1, wherein the electric energy is a first electric energy, and the transfer device is configured to receive a second electric energy from the propulsion vehicle.

12. The mobile energy supply system of claim 1, further comprising a controller that is configured to direct the energy converter to convert at least a portion of the supply of the fuel from the fuel source into the electric energy responsive to receiving an indication of an increase in demand for the electric energy.

13. The mobile energy supply system of claim 1, further comprising a controller that is configured to direct the energy converter to convert at least a portion of the supply of the fuel from the fuel source into the electric energy responsive to a state of charge of an energy storage device onboard the propulsion vehicle falling below a predetermined threshold.

14. The mobile energy supply system of claim 1, further comprising a communication device configured to communicate one or more operational signals between the energy converter and the propulsion vehicle.

15. The mobile energy supply system of claim 14, wherein the one or more operational signals include one or more of a capacity of an energy storage device, a state of charge of the energy storage device, a temperature of the energy storage device, an amount of the fuel in the fuel source, or a temperature of the energy converter.

16. A method comprising:
converting at least a portion of a supply of fuel held in a fuel source onboard a vehicle chassis into electric energy using an energy converter also onboard the vehicle chassis;
transferring the electric energy from the vehicle chassis to a propulsion vehicle; and
powering a propulsion system of the propulsion vehicle using the electric energy.

17. The method of claim 16, further comprising sending the electric energy from the vehicle chassis to the propulsion vehicle via one or more of a rail, a catenary, a cable, or a wireless transfer system.

18. The method of claim 16, further comprising:
storing at least some of the electric energy on an energy storage device onboard the vehicle chassis; and
transferring the at least some of the electric energy stored in the energy storage device to the propulsion vehicle.

19. The method of claim 16, further comprising storing at least some of the electric energy in an energy storage device onboard the vehicle chassis, the energy storage device including one or more of a battery cell, a capacitor storage bank, or a flywheel.

20. The method of claim 16, further comprising converting at least a portion of the supply of fuel into electric energy using one or more of a fuel cell, a first combination of an engine and a generator, or a second combination of the engine and an alternator.

21. A mobile energy supply system, comprising:
a vehicle chassis;
a fuel source disposed onboard the vehicle chassis and configured to hold a supply of a fuel;
an energy converter disposed onboard the vehicle chassis and configured to convert at least a portion of the supply of the fuel from the fuel source into electric energy; and
a transfer device disposed onboard the vehicle chassis and configured to transfer the electric energy from the energy converter to an energy storage device of a propulsion vehicle for powering a propulsion system of the propulsion vehicle.

22. The mobile energy supply system of claim 21, wherein the energy storage device of the propulsion vehicle includes one or more of a battery cell, a capacitor storage bank, or a flywheel.

* * * * *